United States Patent [19]
Cappello et al.

[11] Patent Number: 5,517,980
[45] Date of Patent: May 21, 1996

[54] STEAM CONTROL ARRANGEMENT OF A COOKING OVEN

[75] Inventors: Massimo Cappello, Portogruaro; Bruno Levi, Azzano Decimo, both of Italy

[73] Assignee: Zanussi Grandi Impianti S.p.A., Pordenone, Italy

[21] Appl. No.: 331,721

[22] Filed: Oct. 31, 1994

[30] Foreign Application Priority Data

Nov. 15, 1993 [IT] Italy ............................. PN9300031 U

[51] Int. Cl.⁶ ..................................................... A21B 1/08
[52] U.S. Cl. ............................... 126/20; 219/401; 99/468
[58] Field of Search ........................ 126/20, 369; 99/468, 99/476; 219/401

[56] References Cited

U.S. PATENT DOCUMENTS

| | | | |
|---|---|---|---|
| 4,701,334 | 10/1987 | Durth | 126/20 |
| 4,722,321 | 2/1988 | Meister | 126/369 |
| 4,856,422 | 8/1989 | Meister . | |

FOREIGN PATENT DOCUMENTS

| | | |
|---|---|---|
| 0183009 | 6/1986 | European Pat. Off. . |
| 0386862 | 9/1990 | European Pat. Off. . |

*Primary Examiner*—Carroll B. Dority
*Attorney, Agent, or Firm*—Pearne, Gordon, McCoy & Granger

[57] ABSTRACT

A steam-operated food cooking oven having a cooking cavity (2), a motor-driven fan (3) located at a rear side of the cooking cavity, and a partition wall (4) to distribute the flow of air generated by the fan into the cooking cavity. A back-chamber (5) accommodates the fan and is delimited on its front side by the partition wall (4) and, on its rear side, by the rear wall (6) of the oven. A tube (9) extends into the back chamber and terminates in a nozzle (10) that is received in an interstice between the rear wall and the fan. An appropriate temperature sensor (11), which is connected to a thermostat device (12), is inserted in the tube (9). A perforated disk is mounted over a motor shaft within the fan and allows air and steam within the back chamber to flow into the interstice and the nozzle therein to thereby communicate with the tube and temperature sensor therein.

2 Claims, 2 Drawing Sheets

STEAM CONTROL ARRANGEMENT OF A COOKING OVEN

BACKGROUND OF THE INVENTION

The present invention generally relates to a food cooking oven with fan-assisted operation that is adapted to also cook foods by "steaming". More particularly, the present invention relates to an oven which performs the type of cooking that introduces water or steam into the cooking cavity so as to create special food cooking conditions and effects inside said cooking cavity.

In the following description, reference is made in particular to a food cooking oven of the type intended for use in catering operations, professional kitchens, and similar applications. It will, however, be appreciated that what is described and claimed herein actually applies to any kind of food cooking oven that is provided with a forced-convection feature and a "steaming" capability for cooking foods.

It is generally known that, when foodstuffs are cooked in an oven, the related process can be carried out according to different methods and under widely differing conditions, depending on the actual results and effects that one wishes to reach. In this connection, one of the most widely appreciated cooking methods is certainly the so-called steaming process consisting of letting water or steam into the cooking cavity.

This particular cooking method is widely known, so that it shall not be dealt with any farther herein, except for a reference to European patent specifications nos. 0 386 862 (Lechmetall) and 0 183 009, as well as to U.S. Pat. No. 4,856,422, which are incorporated by reference herein and show the actual state of the art.

Systems used to let steam into the cooking cavity of cooking ovens with fan-assisted operation are further widely known to make use of a boiler arrangement located outside the cooking cavity for the generation of steam. A conduit is provided to convey the steam from the boiler into the cavity. In such forced-convection/steaming ovens, the need is particularly felt for appropriate provisions allowing for the flow of the steam being let into the cooking cavity to be regulated in accordance with the actual cooking requirements. As a matter of fact, if such provisions are not available, the corresponding usage of energy (power or gas) by such ovens for generating steam, along with the consumption of cooling water used to possibly bring about (with an appropriate arrangement) condensation of the steam that is generated in excess of the actual needs, is particularly high.

To regulate the flow rate of steam entering the cooking cavity, the provision is generally known of arranging a small-bore tube between the inside of the cooking cavity and the outside of the cooking cavity. The tube is located in an area close to and in front of the axis of rotation of the fan wheel, where a negative pressure with respect to the ambient pressure is created due to the air suction action of the fan wheel. The air and the steam being taken in are pushed by the fan, which is generally of the tangential type, towards the side walls of the cavity and, from there, into appropriate channels flanking the side walls along their whole length and height extension. From the channels, the air and steam are then introduced again in the cooking cavity through appropriate slits or openings.

When a cooking process is being carried out for which steam must be let into the cooking cavity (e.g., steaming or mixed steam and hot air operations), the steam itself condenses onto the food being cooked, so that it transfers heat to the food and causes it to cook. Meanwhile, air at a relatively low temperature (approximately 60° C.) flows in from the conduit which is communicating with the outside.

As the cooking process progresses, there is a gradual decrease in the demand of steam which, when the food is eventually cooked, no longer condenses on the food. Therefore, excess steam creates a slight overpressure inside the cooking cavity and starts to flow out from the tube and, in doing so, contacts a probe provided in the tube. The probe is connected to an appropriately rated and adjusted thermostat nearby which then cuts off the flow of steam towards the cooking cavity.

The steam generator is in this way cycled on and off to perform an intermittent type of operation, with a resulting energy saving effect.

However, the cooking cavity is provided with a fan that is arranged on the rear side of the oven and housed in a back-chamber that is separated from the cooking cavity by a vertical partition wall. Thus, for a correct installation of the steam sensing tube, so as to have its inlet/outlet nozzle appropriately located in front of the suction intake of the fan, two holes must be drilled. That is, a first hole must be drilled in the rear wall of the back-chamber and a second hole must be drilled in the vertical partition wall. The tube is made to run through the holes.

However, the required drilling and assembly operations, as well as the additional operations that must be performed in order to seal the rims of the holes around the tube, must be carried out when the structure of the oven is practically already assembled. Also, these operations are not capable of being automated and therefore bring about an interruption in the working cycle, take up considerable time, and therefore are rather expensive in terms of manufacturing economy.

The main drawback of such an arrangement of the tube, however, is especially apparent in the field, i.e., at the user's facilities. As a matter of fact, it is usually a requirement that the cooking cavity regularly undergo a thorough cleaning operation. To this purpose, the need arises to also gain access into the back-chamber and this, of course, calls for the removal of the partition wall and, along therewith, the tube. Now, this ultimately implies that several assembly and disassembly operations must be carried out each time. These operations, although not very complex, keep a person busy, typically the cook, who is not specifically supposed to perform such technical tasks of equipment maintenance. Furthermore, the subsequent re-assembly of the various parts may be quite easily carried out in a wrong way due precisely to the tube. In addition, the whole cleaning operation requires a significant length of time to be completed.

The need therefore arises to provide a cooking oven, in particular for food service applications in catering establishments, the construction of which does not involve any of the above described assembly and disassembly operations concerning the steam conduit, without requiring any significant design and construction changes.

SUMMARY OF THE INVENTION

The present invention is directed toward an improved cooking oven assembly which eases the manufacture, cleaning, and maintenance of the cooking oven as compared to the prior art. More particularly, the present invention is directed toward a cooking oven assembly which does not require the disassembly of the temperature sensing tube in order to clean the back chamber in which the fan is mounted.

In accordance with the present invention, the improved cooking oven assembly includes a cooking cavity, a motor-driven fan located on a rear side of the cooking cavity, a partition wall to distribute a flow of air generated by the fan, a back-chamber receiving the fan and delimited by the partition wall on its front side and by a rear wall of the oven on its rear side, a conduit adapted to transfer steam from an external boiler into the cooking cavity, and a tube extending into the back-chamber.

In further accordance with the present invention, the tube includes a nozzle and a temperature sensing means is inserted in the tube. The temperature sensing means is operably connected to a thermostat means. The tube enters the back-chamber by passing through the rear wall while the nozzle of the tube is accommodated in an interstice or space provided between the rear wall and a rear portion of the fan.

In further accordance with the present invention, a perforated disk is mounted over a motor shaft within the fan and allows air and steam within the back chamber to be communicated to the nozzle.

BRIEF DESCRIPTION OF THE DRAWINGS

The present invention will be more clearly and effectively understood on the basis of the following description which is given merely by way of non-limiting example with reference to the accompanying drawings, in which.

DETAILED DESCRIPTION OF THE PREFERRED EMBODIMENTS

Figure 1:
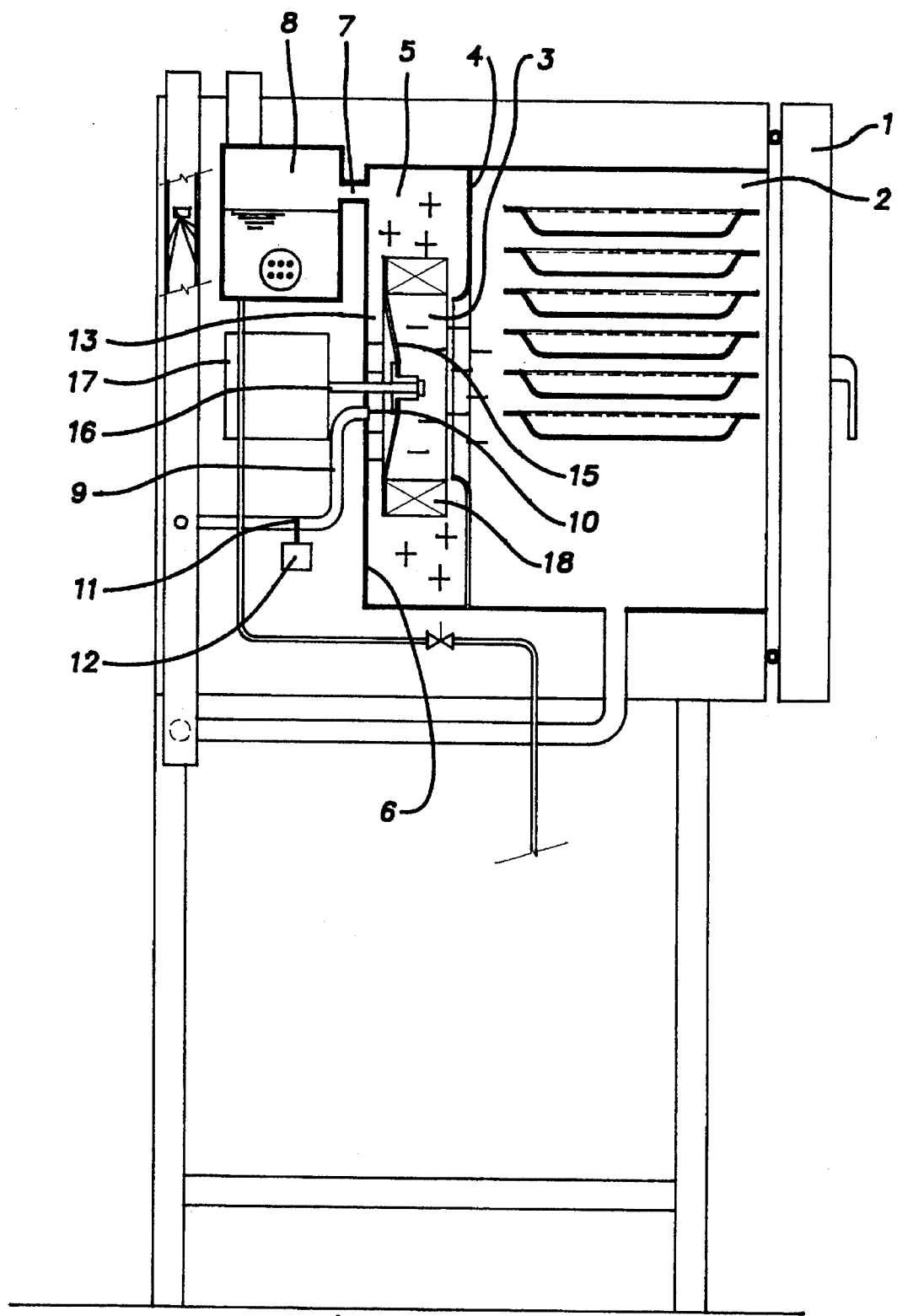
FIG. 1 is a schematic side view of a vertical cut-away of the longitudinal section of a cooking oven according to the present invention.

FIG. 1 shows the inside of a food cooking oven intended for food-service operations or catering establishments according to the present invention. The oven includes a door 1 provided to gain access into the inside of the cooking cavity 2, and a motor-driven fan 3 located on the back side of the cooking cavity. A partition wall 4 distributes and diffuses the air flow generated by the fan 3. A back-chamber 5 accommodating the fan 3 is delimited at its front side by the partition wall 4 and at its rear side by a rear wall 6 of the oven.

An appropriate conduit 7, which is supplied with steam flowing from an external boiler 8, is used to introduce steam into the cooking cavity.

During an experimental investigation carried out with a view to identify a more effective arrangement for a tube 9 provided to take in steam or air, it has been found that when a nozzle 10 of the tube is positioned behind the fan 3 and oriented towards the fan 3, a sequence of positive and negative pressure values are achieved that coincide exactly with values that are recorded in front of the fan, although slightly attenuated in their intensity. However, such a reduced intensity of the pressure variations does not impair the correct utilization of the tube 9 and a probe 11 of the thermostat means 12. The temperature sensor or probe 11 is inserted in the tube 9, as illustrated. It is in fact sufficient to increase, even to a slight extent, the flow section of the tube 9 in order to ensure an optimum air or steam passage inside it even with minimum pressure differences across the tube, i.e., existing at both ends of the tube.

This particular behavior has been explained with the fact that the steam pressure existing inside the cavity 2 after the cooking process is concluded is sufficiently high as to be able to overcome the slight negative pressure caused by the rotation of the fan wheel and permeate through the interstice 13 formed between the rear wall 6 and the rear portion of the fan in the back-chamber 5.

In this way, the tube 9 can therefore be arranged in a very economical and reliable manner, is not exposed to any risk of its arrangement being altered for any reason, does not require being disassembled or removed even when the oven must be thoroughly and completely cleaned, and has a simplified and economical construction.

Figure 2:
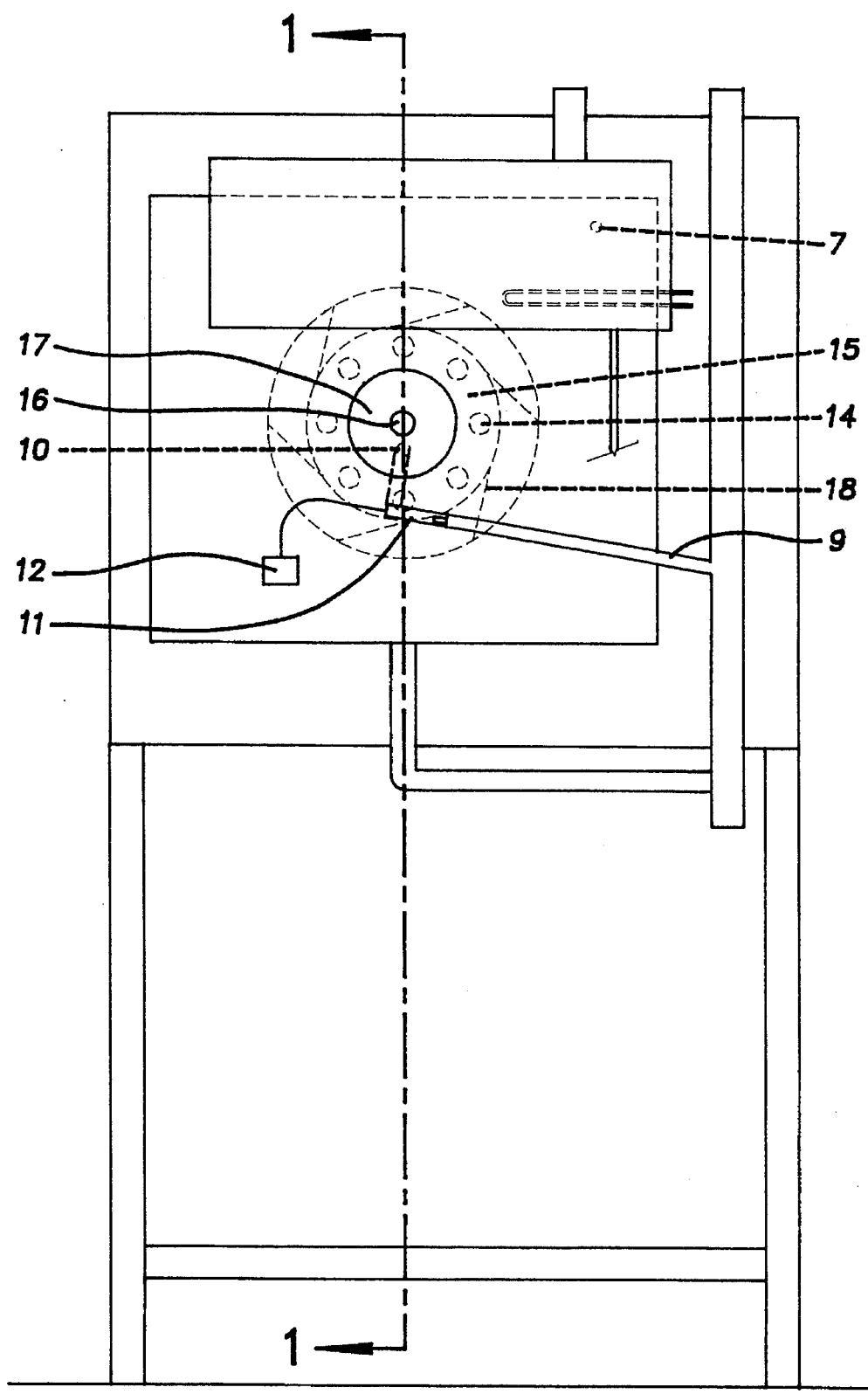
FIG. 2 is a schematic rear view of a vertical cut-away of the transverse section of the cooking oven shown in FIG. 1.

A further improvement in the embodiment of the present invention, shown in FIGS. 1 and 2, is reached by letting the inside of the cooking chamber communicate more effectively with the space behind the fan 3 where the nozzle 10 is situated. Such a more effective communication is reached by providing a plurality of openings 14 in a disk 15 which is shrink-fitted onto a shaft 16 of a motor 17 transmitting motion from the motor 17 to blades 18 of the fan wheel.

The openings, by actually letting the interstice 13 communicate directly with the cooking cavity 2, are instrumental in promoting the direct passage of steam into the tube 9 and, as a consequence, in improving the rapidity of the response of the thermostat means 12 to variations in the conditions prevailing in the cooking cavity.

The oven is of course provided with a number of further devices and component parts, which are however substantially irrelevant as far as the actual purpose of this invention is concerned and shall therefore not be dealt with here any further.

Although the invention has been described on the basis of the example represented by some preferred embodiments thereof, and using a generally known terminology, it cannot be considered as been limited by these, since anyone skilled in the art will appreciate that a number of variations and modifications can be further made involving both construction and shape.

What is claimed is:

1. A steam-operated food cooking oven, comprising an access door (1), a cooking cavity (2), a motor-driven fan (3) located on a rear side of said cooking cavity, a partition wall (4) to distribute a flow of air generated by said fan, a back-chamber (5) accommodating said fan and delimited by said partition wall (4) on its front side and by a rear wall (6) of the oven on its rear side, a conduit (7) adapted to transfer steam from an external boiler (8) into said cooking cavity, a tube (9) extending into said back chamber (5), said tube terminating with a nozzle (10), and a temperature sensing means (11) operably connected to a thermostat means (12), said temperature sensing means being inserted in said tube (9), wherein said tube (9) enters said back-chamber (5) by passing through said rear wall (6), whereas said nozzle (10) of the tube is accommodated in an interstice (13) provided between the rear wall (6) and a rear portion of the fan (3).

2. A steam-operated food cooking oven according to claim 1, wherein the fan is provided with an internal disk (15), said internal disk being fitted onto a shaft (16) of a motor (17) which drives the fan, and wherein a plurality of openings (14) are formed in said internal disk (15) to permit air and steam within the back-chamber to be communicated to the nozzle located between the fan and the rear wall.

\* \* \* \* \*